United States Patent
Morey et al.

(10) Patent No.: US 8,386,134 B2
(45) Date of Patent: Feb. 26, 2013

(54) MACHINE TO-MACHINE COMMUNICATION SYSTEM FOR PAYLOAD CONTROL

(75) Inventors: Stephen J. Morey, Peoria, IL (US); Timothy A. Vik, Sparland, IL (US); Richard D. Johnston, Moweaqua, IL (US); Jonathan W. Rothwell, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 1408 days.

(21) Appl. No.: 11/905,334

(22) Filed: Sep. 28, 2007

(65) Prior Publication Data
US 2009/0088961 A1      Apr. 2, 2009

(51) Int. Cl.
G06F 19/00 (2006.01)
G06F 17/10 (2006.01)
G05D 5/00 (2006.01)
G01D 21/00 (2006.01)
G01G 19/08 (2006.01)

(52) U.S. Cl. ............ 701/50; 701/124; 37/413; 177/136; 172/430

(58) Field of Classification Search ................ 701/1, 50, 701/124, 200, 207, 208, 211, 300, 23, 24, 701/29.1, 29.3, 32.3, 400, 408, 409, 25; 37/195, 37/414, 411, 413; 177/139, 132, 136; 172/1, 172/430
See application file for complete search history.

(56) References Cited

U.S. PATENT DOCUMENTS

| | | | |
|---|---|---|---|
| 4,835,719 A | 5/1989 | Sorrells | |
| 4,852,674 A | 8/1989 | Gudat | |
| 5,067,572 A | 11/1991 | Kyrtsos et al. | |
| 5,359,521 A | 10/1994 | Kyrtsos et al. | |
| 5,438,771 A | 8/1995 | Sahm et al. | |
| 5,509,293 A * | 4/1996 | Karumanchi | 73/1.13 |
| 5,546,093 A | 8/1996 | Gudat et al. | |
| 5,626,356 A | 5/1997 | Harwood | |
| 5,850,341 A * | 12/1998 | Fournier et al. | 701/50 |

(Continued)

FOREIGN PATENT DOCUMENTS

| | | |
|---|---|---|
| GB | 2342640 | 4/2000 |
| JP | 04031139 | 2/1992 |

(Continued)

OTHER PUBLICATIONS

Morey et al., U.S. Appl. No. 11/896,195, filed Aug. 30, 2007.

*Primary Examiner* — Thomas Tarcza
*Assistant Examiner* — Edward Pipala
(74) *Attorney, Agent, or Firm* — Finnegan, Henderson, Farabow, Garrett & Dunner LLP (57) ABSTRACT

A method for enhancing payload control is disclosed. The method includes removing material during a plurality of work cycles with at least one loading machine and associating the loading machine relative to at least one haulage machine. The method also includes determining the relative locations of the loading machine and the haulage machine and, during the plurality of work cycles, loading removed material into the haulage machine with the loading machine. The method also includes determining payload and payload distribution within the haulage machine at least before a last work cycle of the plurality of work cycles and communicating to the loading machine, via a machine-to-machine communication system, the amount and position within the haulage machine of additional payload desired in at least the last work cycle of the plurality of work cycles for desired payload and payload distribution.

23 Claims, 4 Drawing Sheets

U.S. PATENT DOCUMENTS

| | | |
|---|---|---|
| 6,037,550 A | 3/2000 | Bradley |
| 6,037,901 A | 3/2000 | Devier et al. |
| 6,157,889 A | 12/2000 | Baker |
| 6,247,538 B1 | 6/2001 | Takeda et al. |
| 6,429,812 B1 | 8/2002 | Hoffberg |
| 6,668,157 B1 | 12/2003 | Takeda et al. |
| 6,728,619 B2 | 4/2004 | Adachi et al. |
| 6,829,943 B2 | 12/2004 | Weyand et al. |
| 6,931,772 B2 | 8/2005 | Furuno et al. |
| 6,985,795 B2 | 1/2006 | Scotese |
| 7,072,763 B2 | 7/2006 | Saxon et al. |
| 2004/0167705 A1 | 8/2004 | Lingman et al. |
| 2005/0283296 A1 | 12/2005 | Viaud |
| 2006/0092033 A1 | 5/2006 | Hoff et al. |

FOREIGN PATENT DOCUMENTS

| | | |
|---|---|---|
| JP | 05297942 | 11/1993 |
| JP | 2006200268 | 8/2006 |
| WO | 9530880 | 11/1995 |
| WO | 9530880 | 5/2007 |
| WO | 2007061499 | 5/2007 |

* cited by examiner

MACHINE-TO-MACHINE COMMUNICATION SYSTEM FOR PAYLOAD CONTROL

TECHNICAL FIELD

The present disclosure is directed to a machine-to-machine communication system, and more particularly, a machine-to-machine communication system for payload control.

BACKGROUND

Machines may be used to move earth, rocks, and other materials from one location to another. It may be desirable to move material from an excavation site, for example, to another location sufficiently removed from the excavation site that the material must be transported some distance before being dumped. For example, the earth, rocks, and/or other materials may be loaded by one machine, such as a wheel loader, onto another machine, such as an off-highway truck, that may, in turn, transport the materials to a dump site.

It may be important that the payload of the machine that transports the materials be within a certain load range, and that it be balanced within the payload carrier of the machine. A payload that is too heavy and/or not optimally balanced or distributed in an off-highway truck may increase tire wear, adversely affect fuel economy, and damage machine components. In addition, machine design limits may be exceeded if an off-highway truck is extensively overloaded. This may adversely affect braking and/or steering performance. Even if machine components are not immediately damaged by a particular payload that may be excessive and/or unbalanced, the machine may be unduly stressed, and excessive component wear may result. A payload that is not optimally distributed may result in poor ride control and operator stress. In addition, a payload that is too light may decrease productivity. It is desirable that there be efficient and effective communication between a machine that is loading and a machine that is being loaded in order to ensure proper payload control.

U.S. Pat. No. 5,546,093 issued to Gudat et al. on Aug. 13, 1996 ("the '093 patent"), discloses a system and method for providing navigation signals to assist one machine in loading another machine at a worksite. The '093 patent discloses the use of a navigation system, such as a Global Positioning System (GPS), in determining a desired location of a hauling machine based on a current position of a loading machine. The loading machine may dump material into the hauling machine at different positions between successive work cycles to allow for even distribution of material into the hauling machine. The hauling machine may be equipped with a system for monitoring payload, and the loading machine may be notified when the hauling machine is filled to capacity.

While the system of the '093 patent may provide some degree of communication between a loading machine and a hauling machine and some degree of payload control, the system of the '093 patent can be improved upon. While alluding to even distribution of material, the system of the '093 patent does not account for differing distribution characteristics among materials of different sizes. Also, the system of the '093 patent does not communicate data to the loading machine so that it may know where to deposit a load, or how much material to deposit in a given load. In addition, while mentioning filling the hauling machine to capacity, the system of the '093 patent does not account for situations where one more load from the loading machine may exceed the optimal capacity of the hauling machine. As a result, material may not be evenly distributed and the hauling machine, in fact, may be overloaded.

The present disclosure is directed to one or more improvements in the existing technology.

SUMMARY OF THE INVENTION

In one aspect, the present disclosure is directed to a method for enhancing payload control. The method includes removing material during a plurality of work cycles with at least one loading machine. The method also includes associating the at least one loading machine relative to at least one haulage machine. The method also includes determining the relative locations of the at least one loading machine and the at least one haulage machine. The method includes, during the plurality of work cycles, loading removed material into the at least one haulage machine with the at least one loading machine. The method also includes determining payload and payload distribution within the at least one haulage machine at least before a last work cycle of the plurality of work cycles. The method also includes communicating to the at least one loading machine, via a machine-to-machine communication system, the amount and position within the at least one haulage machine of additional payload desired in at least the last work cycle of the plurality of work cycles to obtain desired payload and payload distribution within the at least one haulage machine.

In another aspect, the present disclosure is directed to a system for enhancing payload of a haulage machine. The system includes a fleet of machines, including at least one haulage machine and at least one loading machine, the at least one loading machine configured to remove material and load the material into the at least one haulage machine during a plurality of work cycles. The system also includes a machine-to-machine communication system configured to provide communication between the at least one haulage machine and the at least one loading machine. The system includes a controller associated with the at least one haulage machine and configured to determine the payload and payload distribution within the at least one haulage machine at least before a last work cycle of the plurality of work cycles. The system also includes a controller associated with the at least one loading machine configured to receive, via the machine-to-machine communication system, a signal from the at least one haulage machine indicating the amount and position within the at least one haulage machine of additional payload required in a last work cycle of the plurality of work cycles to obtain desired payload and payload distribution within the at least one haulage machine.

DETAILED DESCRIPTION

Figure 1:
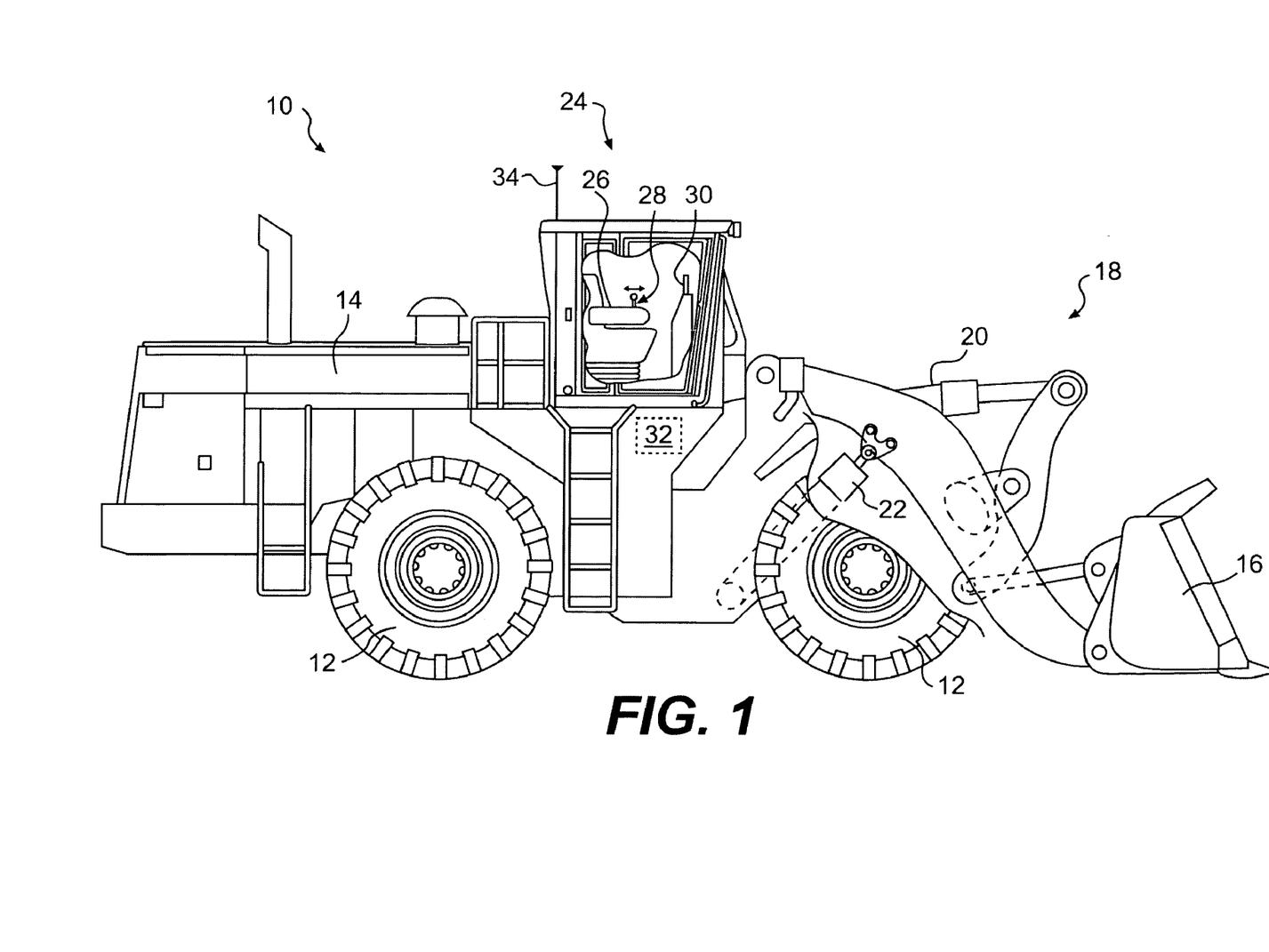
FIG. 1 is a diagrammatic illustration of a loading machine according to an exemplary disclosed embodiment.

FIG. 1 diagrammatically illustrates one exemplary embodiment of a loading machine 10 which may be, for example, a wheel loader. Loading machine 10 may be propelled and transported on ground engaging devices 12, enabling the machine to function as a mobile unit. While ground engaging devices 12 are illustrated as wheels, it will be understood that loading machine 10 may be propelled and transported by other types of ground engaging devices, such as tracks. A suitable power source 14, e.g., a diesel engine, may be located on the loading machine 10 and may serve to drive one or more of the ground engaging devices and other components of loading machine 10.

A bucket 16 may be attached to loading machine 10 by suitable linkage 18, and may be manipulated via linkage 18 by suitable actuators 20, 22. It will be understood that the type and size of bucket 16 and the particular arrangement of linkage 18 may vary with the model and size of the loading machine 10. Loading machine 10, via ground engaging devices 12 and power source 14, may engage bucket 16 against material to be loaded, and through a series of successive work cycles, remove material from one location and deposit the material in another location. For example, at a mine, quarry, or excavation site, bucket 16 may be driven into a bank or pile of material in order to fill the bucket. Linkage 18 may be employed to raise the bucket, ground engaging devices 12 may be employed to suitable relocate the machine, and the material may be loaded into a pile or a suitable container.

Loading machine 10 may further include an operator station 24. Operator station 24 may include an enclosed or partially enclosed cab, and may include an operator seat 26, suitable operator control devices 28, and a display device 30. Display device 30 may be, for example, a dedicated display device that displays information, images, etc., or it may be an interactive touch screen display that permits an operator to perform control functions and/or input information. In addition to display device 30, loading machine 10 may include an auditory system, controlled between on and off positions by an operator, and configured to provide audible directions, data, etc. to the operator. Loading machine 10 also may include a suitable control system, including a controller 32, various detectors or sensors, and various actuators for operating the several components associated with the machine. In addition, machine 10 may include components of a machine-to-machine communication system, generally designated at 34.

In FIG. 1, machine-to-machine communication system 34 is illustrated as associated with operator station 24. However, it will be understood that machine-to-machine communication system 34 may be, in fact, a system of components that enable machine 10 to communicate with other machines of a fleet of machines. Machine-to-machine communication system 34, as illustrated diagrammatically in FIG. 1, may include those components of the communication system that enable machine 10 to receive and send signals, and that communicate with controller 32 and/or display device 30, for example. In exemplary embodiments, controller 32 and/or display device 30 may be considered components of the machine-to-machine communication system 34.

It is sometimes expedient that a loading machine be associated with one or more haulage machines. For example, while loading machine 10 may be operated to remove material from one location, and then maneuver to another location to dump the material in a pile, it is frequently necessary and desirable to transport the removed material to a remote location. In such a situation, a loading machine may load the removed material into one or more haulage machines.

Figure 2:
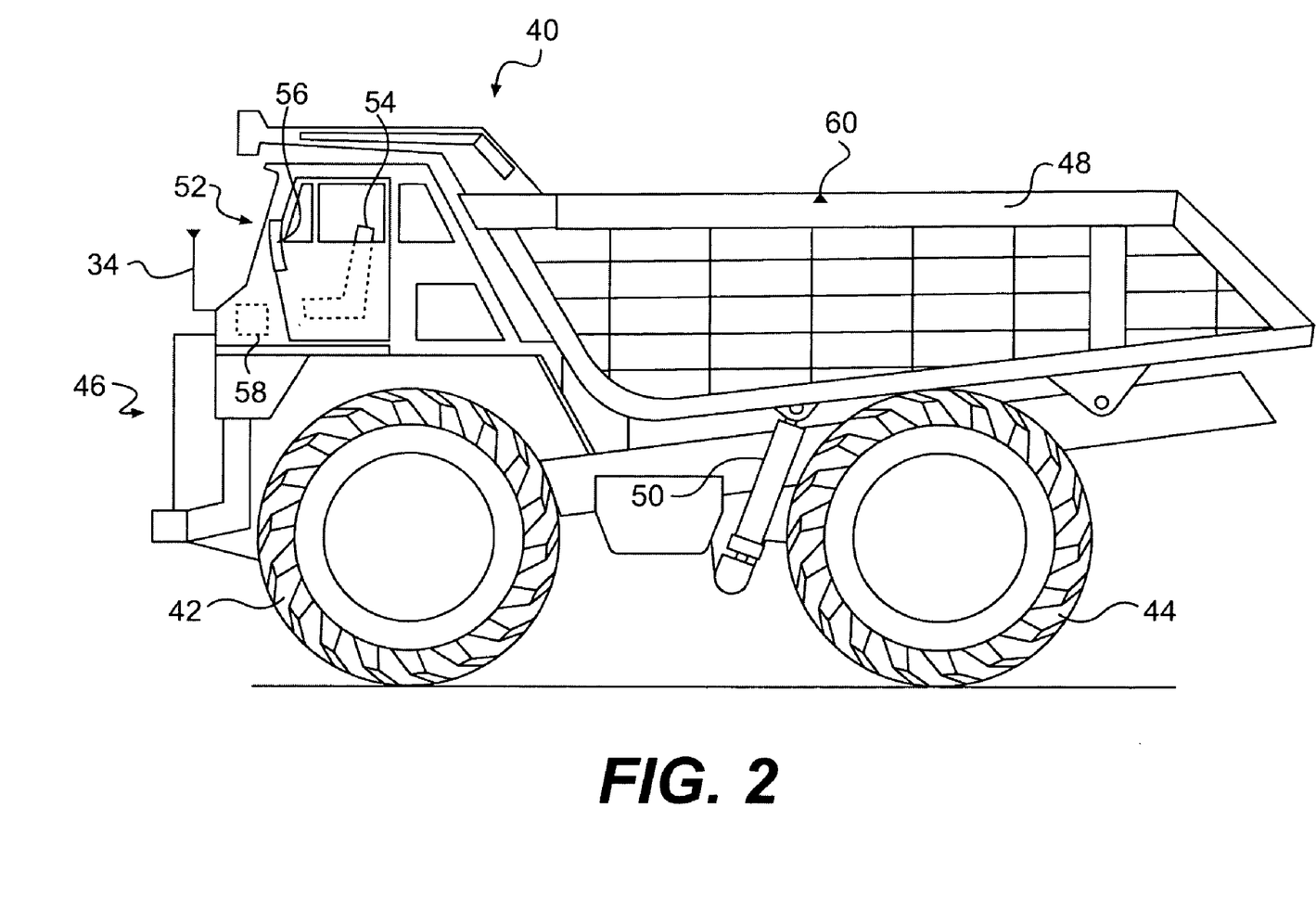
FIG. 2 is a diagrammatic illustration of a haulage machine according to an exemplary disclosed embodiment.

FIG. 2 diagrammatically illustrates one exemplary embodiment of a haulage machine 40 which may be, for example, an off-highway truck. Haulage machine 40 may be propelled and transported on ground engaging devices 42 and 44, for example. Haulage machine 40 may include a suitable power source 46, e.g., a diesel engine, located on the machine 40 and serving to drive one or more of the ground engaging devices and other components of machine 40. A suitable receiving container 48 may be located on the haulage machine 40 to receive a payload. The receiving container 48 may be manipulated to a dumping position via, for example, an actuator 50.

Haulage machine 40 may include a suitable operator station 52. Operator station 52 may include an enclosed or partially enclosed cab, and may include an operator seat 54, suitable operator control devices (not designated), and a display device 56. Haulage machine 40 also may include a suitable control system, including a controller 58, various detectors and/or sensors, and various actuators for operating the several components associated with the machine. In addition, machine 40 may include components of the machine-to-machine communication system, described in connection with loading machine 10, and generally designated in FIG. 2 again at 34. A visual indication 60 may be provided on the receiving container 48 to visually apprise an observer, such as the operator of a loading machine, of the location of the center point for payload distribution within the receiving container 48.

Haulage machine 40 may include equipment for determining the amount and distribution of payload within the receiving container 48 of haulage machine 40 at any given point in time. For example, haulage machine 40 may be equipped with pressure sensors associated with supporting struts for the frame of haulage machine 40. Pressure within the several struts may yield data indicating the amount of payload accumulated within the receiving container 48, and variations in pressure within the several supporting struts may yield data indicative of payload distribution. Other expedients, such as strategically located cameras, GPS technology, etc., may be employed to ascertain both amount of payload and payload distribution. Haulage machine controller 58 may receive data representing payload and payload distribution, and send signals representing both payload and payload distribution and the location and amount of material required in a succeeding pass by a loading machine to achieve proper payload and/or payload distribution.

Various technologies may be employed to sense or detect parameters and conditions associated with machines 10 and 40, or conditions associated with other machines of a fleet of machines. It may be desirable to ascertain with a degree of precision the relative positions of two machines, such as loading machine 10 and haulage machine 40 during a loading operation, for example. To that end, one or more of GPS, radar, and/or satellite vision technologies may be employed to monitor the positions of machines 10 and 40, as well as other machines of a fleet of machines.

Each of controllers 32 and 58 may include a central processing unit, a suitable memory component, various input/output peripherals, and other components typically associated with machine controllers. Controllers 32 and 58 may include programs, algorithms, data maps, etc., associated with operation of machines 10 and 40. Controllers 32 and 58 may be configured to receive information from multiple sources, such as, for example, one or more machine actuators, various sensors or detectors (e.g., for machine travel direction, ground speed, engine operation, etc.), as well as input from a machine operator via, for example, control devices 28 of machine 10 and suitable control devices of machine 40. Controllers 32 and 58 may be suitably located to send and receive appropriate signals to and/or from the various sensors, actuators, etc., associated with machines 10 and 40.

Figure 3:
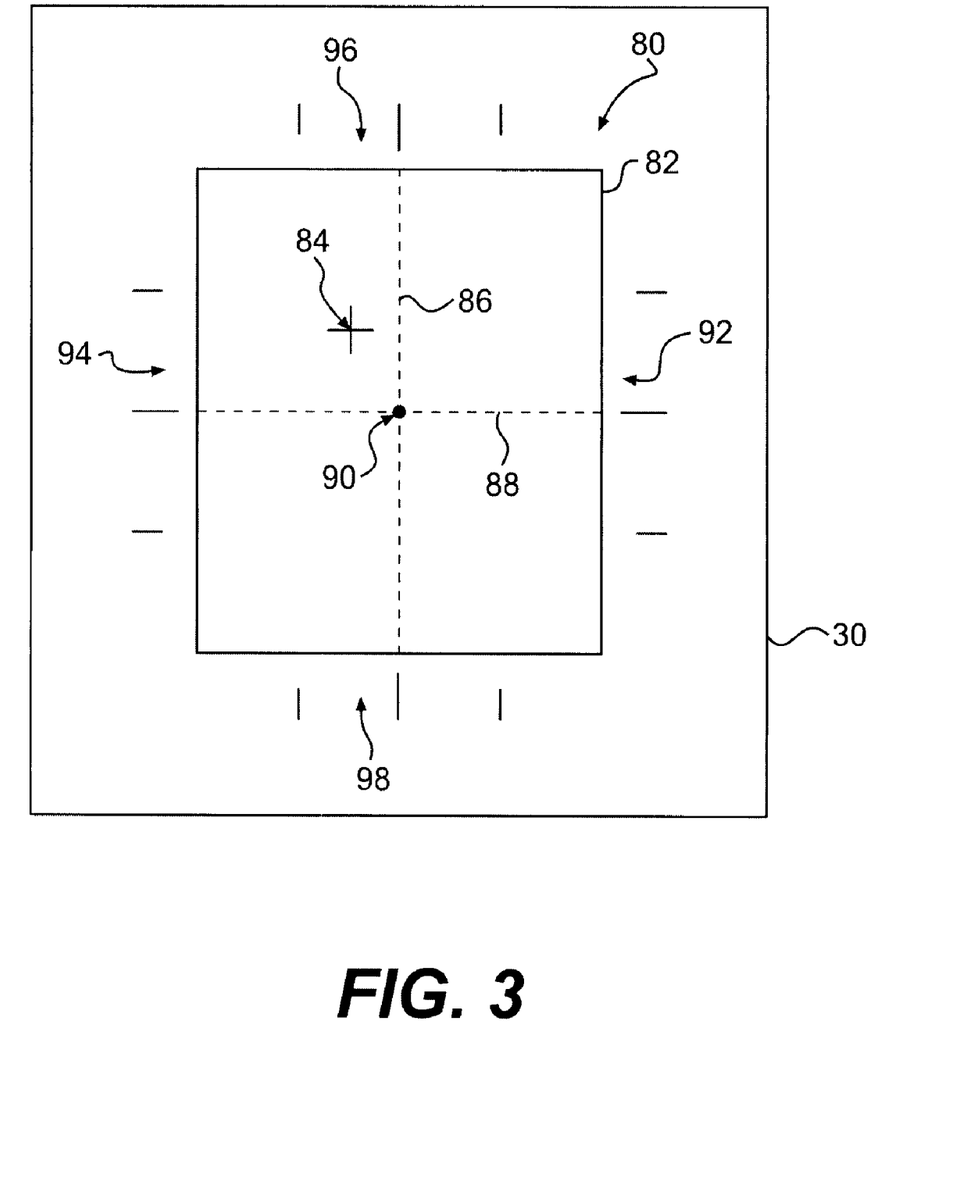
FIG. 3 is a diagrammatic illustration of a display device displaying a visual representation of a receiving container of a haulage machine according to an exemplary disclosed embodiment.

FIG. 3 diagrammatically illustrates one exemplary embodiment of a display device 30, associated with operator station 24 of loading machine 10, for example. Display device 30 may be a dedicated display device, configured only to display data such as characters, symbols, and images, or display device 30 may be a component of a touch screen display that is configured both to display data and to receive operator input. While display device 30 may be configured to receive and display various information and data associated with machine-to-machine communication system 34, controller 32 of loading machine 10, and/or controller 58 of haulage machine 40, FIG. 3 diagrammatically illustrates one exemplary image forming a visual representation 80 on display device 30 of a receiving container 48 of haulage machine 40.

Referring to the exemplary visual representation 80 in FIG. 3, the image may include an outline 82 corresponding to the peripheral outline of receiving container 48 of haulage machine 40. An operator of loading machine 10 may be apprised, via the visual representation 80, of parameters of the receiving container 48 and the location at which to deposit the next load into the receiving container 48 in order to ensure proper payload distribution. For example, after one or more work cycles of loading machine 10 during which a load has been deposited within haulage machine 40, a signal may be received from controller 58 of haulage machine 40 indicating where a next load should be deposited for proper payload distribution, and/or how much material should be deposited in a next load. The point 84 in FIG. 3 (indicated by a plus (+) sign) is intended to represent an exemplary situation wherein the signal received from loading machine 40 indicates that the next load from loading machine 10 should be deposited at that point.

As shown in the exemplary embodiment illustrated in FIG. 3, the front-to-back centerline 86 and/or the side-to-side centerline 88 may be indicated on the visual representation 80. The center point 90 indicated in FIG. 3 exemplifies a situation wherein the load split between the front and rear of the receiving container 48 of haulage machine 40 is even. Various haulage machines 40 may have differing load splits for a proper distribution of the payload to be carried. For example, some machine may have a load split with one-third of the load carried by the front machine axle and two-thirds of the load carried by the rear machine axle. Other machines may have a load split with more of the load carried toward the front axle than toward the rear axle. Accordingly, the visual representation 80 may vary in accordance with the particular machine size parameters, including the load split of the haulage machine 40 that is associated with the loading machine 10 during a given plurality of work cycles of the loading machine 10.

The exemplary visual representation 80 of FIG. 3 illustrates a situation wherein the receiving container 48 may be divided into quadrants. Other divisions are contemplated, depending on the particular haulage machine parameters. Visual representation 80 may be oriented so as to correspond to the orientation of the haulage machine 40 to be loaded, with, for example, right side 92, left side 94, machine front 96, and machine rear 98.

INDUSTRIAL APPLICABILITY

Figure 4:
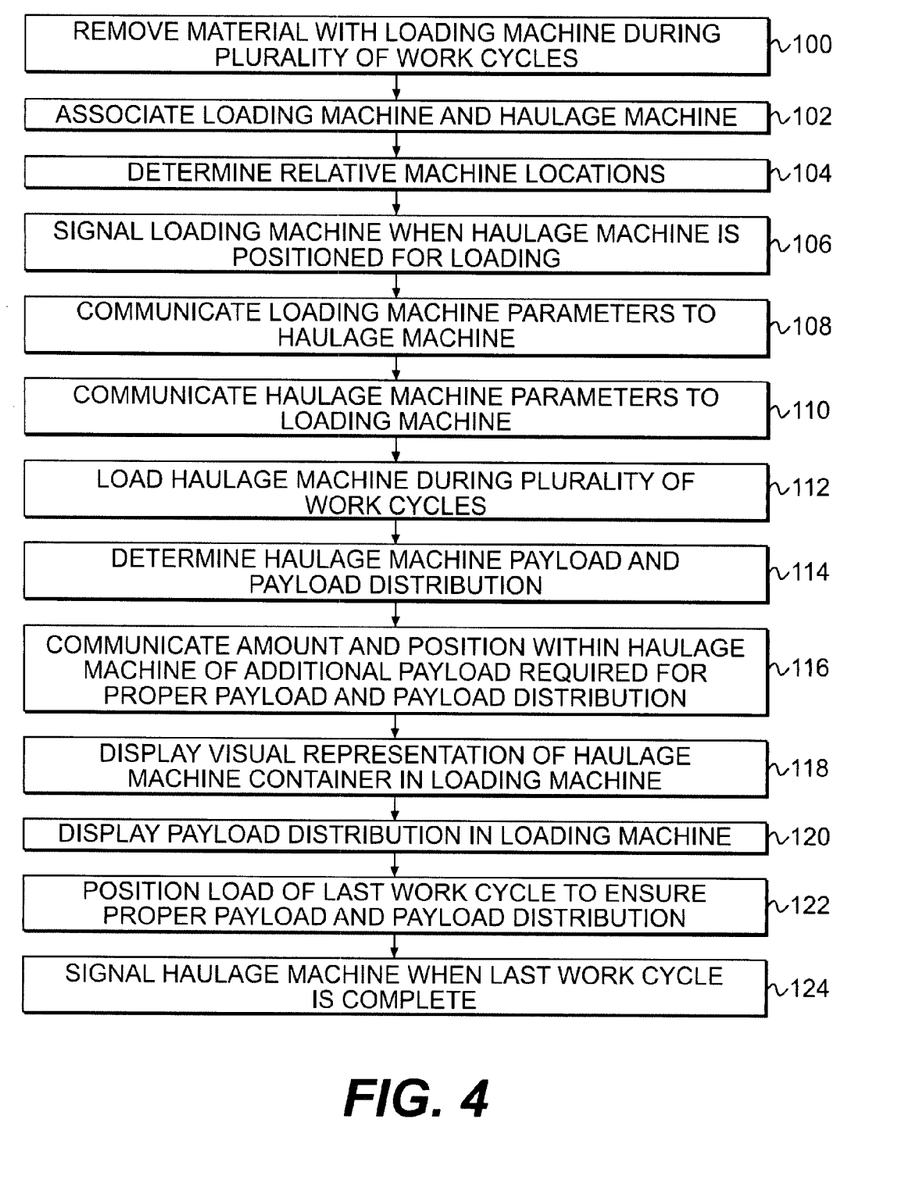
FIG. 4 is a block diagram illustrating aspects of a method according to an exemplary disclosed embodiment.

FIG. 4 diagrammatically and schematically illustrates various aspects that typically may be involved in a method in accordance with exemplary embodiments of the disclosure. It should be noted that, of the various items set forth in FIG. 4, all may not necessarily be present in a given operation involving machine-to-machine communication in optimizing payload. In addition, the sequence of the various indicated items may vary, depending, for example, on the particular work site involved, the types of machines employed, etc.

Referring to FIG. 4, material is removed from a site, at 100, with a loading machine 10 during a plurality of work cycles. A work cycle includes, for example, an operation during which a loading machine 10 engages the material to be removed, fills the loading machine bucket 16 with the material, maneuvers the loading machine 10 to a dumping position, dumps the material, and returns to again engage the material. The material may be derived from a pile or a digging face within an excavation, for example. The material may comprise granular material, gravel, soil, rocks, rip-rap, a mixture of material of various sizes, etc.

Where material to be removed is to be transported from the site, a loading machine 10 may be associated with one or more haulage machines, at 102. While it is convenient to describe the operation in terms of a single loading machine 10 and a single haulage machine 40, it will be understood that there may be a fleet of machines working in association, with at least one loading machine 10, and any desired number of haulage machines deemed appropriate to optimizing productivity at a given site. The association of a loading machine 10 and a haulage machine 40 may include ensuring that an appropriate machine-to-machine communication system 34 is operational, enabling the loading machine 10 and the haulage machine 40 to exchange information with each other.

The relative machine locations are determined at 104. Determining relative machine locations may involve employing GPS technology, radar technology, cameras, and/or other suitable locating technologies that may enable the relative positions of at least the loading machine 10 and the haulage machine 40 to be determined and known to the two machines via the machine-to-machine communication system 34.

As a material moving operation proceeds to the stage at which a haulage machine is to be loaded, the haulage machine 40 may maneuver to a position in close association with the loading machine 10. The haulage machine 40 may signal the loading machine 10 when the hauling machine 40 is positioned for loading, at 106. Determination of proper positioning of the haulage machine 40 may be visually apparent to the haulage machine operator. In such a situation, the haulage machine operation may signal, via the machine-to-machine communication system 34 and using, for example, a touch screen display, that loading may begin. The loading machine 10 may receive the signal via the display device 30 located within the loading machine 10, or via an audible signal, for example.

At some point, for example before loading begins, the loading machine 10 may communicate its loading machine parameters to the haulage machine 40, at 108. Similarly, the haulage machine 40 may communicate its haulage machine parameters to the loading machine 10, at 110. Loading machine 10 and hauling machine 40 parameters vary, for example with the size and type of machine. The respective parameters of loading machines and haulage machines may affect visual images on the respective machine display devices 30 and 56, for example. In addition, the parameters may affect initial placement of the haulage machine 40 relative to the loading machine 10, and may affect machine calculations for determining when optimum payload and payload distribution have been achieved.

Once the haulage machine 40 is properly positioned for loading and has signaled that event to the loading machine 10, and once each machine is aware of the parameter of the other, the loading machine 10 may load the haulage machine 40 during a plurality of work cycles, at 112. The number of work cycles necessary for a particular loading machine 10 to load a particular haulage machine 40 to proper capacity, e.g., proper payload and payload distribution, may vary with the respective sizes and other parameters of the two machine. Display device may provide directions to a loading machine operator, for example, giving guidance to the proper material pile. Alternatively, instructions may be giving audibly via an auditory system.

Haulage machine payload and payload distribution may be determined at 114. It may be desirable to determine payload and/or payload distribution before the last work cycle of loading machine 10, or before each work cycle of loading machine 10. For example, as the receiving container 48 of the haulage machine 40 approaches capacity, and when it is apparent that only one more pass of the loading machine 10 will achieve capacity for the haulage machine 40, it may be desirable to ascertain how much payload is required to achieve the proper payload capacity, and where the last load must be placed to ensure proper payload distribution. Alternatively, achieved payload and present payload distribution may be ascertained before each work cycle of the loading machine 10.

Once the presently achieved payload and payload distribution has been determined, the amount and position within the receiving container 48 of the haulage machine 40 for additional payload required for proper payload and payload distribution are calculated and communicated to the loading machine 10, at 116. Calculation of the required amount and position may be performed, for example, either by the controller 58 of the haulage machine 40 or by the controller 32 of the loading machine 10.

Within the loading machine 10, display device 30 may display a visual representation 80 of the haulage machine receiving container 48, at 118. The visual representation 80 may graphically indicate to the loading machine operator the relative size of the receiving container 48 in accordance with identification parameters received from the haulage machine 40, for example at 110. The visual representation 80 may include a division of the receiving container 48 into quadrants or sections, an indication of container centerlines, the center point of load distribution for the receiving container, etc.

During loading of the haulage machine 40, payload distribution within the receiving container 48 of the haulage machine 40 is displayed within the loading machine, at 120, and updated as loading proceeds. For example, after a pass by the loading machine 10 during which a load is placed within the receiving container 48, the haulage machine 40 may determine current payload and payload distribution, as at 114, and communicate the requisite amount and position that may be required for proper payload and payload distribution, as at 116. This information is processed by, for example, controller 32 of the loading machine 10, and displayed graphically to the operator of the loading machine. For example, the "plus" (+) sign located in the visual representation 80 in FIG. 3 indicates to the loading machine operator that the next load should be deposited at that point 84 in order to achieve proper payload distribution.

As loading of the haulage machine 40 nears capacity, and when it is apparent that the next load is the last load before exceeding capacity of the haulage machine 40, the loading machine 10 may position the load of the last work cycle so as to ensure proper payload and payload distribution, at 122. Circumstances may dictate that the last load should be placed at the point 84 indicated in FIG. 3, for example, and that the amount of the load in order not to exceed capacity is substantially less than a full load of bucket 16. In such a situation, assuming the loading machine 10 is loading the haulage machine 40 from the right side 92, the loading machine may fill only the right half of the bucket 16 and position itself to dump the load over the point 84.

Differing materials may tend to distribute differently within receiving container 48. For example, relatively uniform material such as sand or gravel may tend to distribute somewhat evenly. On the other hand, rip-rap, boulders of uneven sizes, rubble, etc., may tend to distribute unevenly to varying degrees. Depending on circumstances, the point (such as point 84 in FIG. 3) at which a next load should be placed for proper payload and/or payload distribution may vary considerably within the quadrants of the receiving container and on the visual representation 80. Visual representation 80 may be updated based on data received from haulage machine 40, via the machine-to-machine communication system, to continuously correspond to the current payload distribution within receiving container 48.

Visual representation 80 may include a display of verbal instructions to a loading machine operator, prior to the last load to be deposited, for example, indicating whether to fill only a portion of bucket 16, whether to fill the left half or the right half of the bucket, etc. Alternatively, a suitable auditory system may be employed to give instructions to the loading machine operator, assisting the operator in adjusting the load, both within the loading machine bucket 16, and loading into receiving container 48 (at the front, back, left side, right side, etc.). In addition, since each of loading machine 10 and haulage machine 40 knows the parameters of the other machine (at 108 and 110), loading machine controller 32 may issue a signal (audible, visible, etc.) to assist the loading machine operator in knowing precisely when the loading machine 10 is properly located relative to the haulage machine 40 to dump the load directly over the proper point 84. Machine-to-machine communication system 34 ensures that the relative locations of loading machine 10 and haulage machine 40 may be updated and known by each machine at any given point in time.

Upon completion of the last work cycle and proper filling of the haulage machine, as at 122, the loading machine may generate a signal to the haulage machine that the last work cycle is complete, at 124. The haulage machine may then proceed to transport the load to the point at which it has been determined that the load should be deposited. The process may continue, for example with another haulage machine.

By controlling payload and payload distribution in accordance with the disclosure, overall productivity of a material removing operation, for example an excavating operation, may be enhanced. Each payload moved by a haulage machine may more closely approach optimum payload and payload distribution. In addition, optimized payload distribution may improve ride control of a haulage machine and reduce operator stress. Also, proper payload and properly balanced and distributed payload will reduce machine stress, reduce maintenance costs due to excessive machine stress, reduce tire wear, and increase the overall structural life of haulage machines.

By employing machine-to-machine communication, machine operators may be provided with updated information, not only with respect to the machine being operated, but also with respect to associated machines. Machine-to-machine communication may enable a single operator of either a haulage machine or a loading machine to reliably operate both machines. In addition, machine-to-machine communication may permit fully autonomous operation of both a loading machine and an associated haulage machine, for example via programmed control from the machine controllers, or from a remote location.

It is to be noted that the term "optimizing," and the like, is to be construed herein, not in the sense of an achieved ideal, but in the sense of a strategically targeted objective to be approached as closely as is reasonably possible. Those skilled in the art will recognize that absolute optimizing of payload and payload distribution may be elusive goals. However, the exemplary embodiments disclosed herein approach optimization of both payload and payload distribution, for example by use of the machine-to-machine communication system in the disclosed exemplary embodiments, to ensure that the relative locations of cooperating machines are known at all times.

It will be apparent to those skilled in the art that the methods and systems disclosed herein may be applicable to machines other than those generally characterized as wheel loaders and off-highway trucks. For example, the loading machine may be of the type generally known as a hydraulic excavator. In addition, the haulage machine could be an on-highway truck or other machine capable of being loaded and transporting a load.

It will be apparent to those skilled in the art that various modifications and variations can be made to the disclosed method and system for enhancing payload control utilizing machine-to-machine communication without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method for enhancing payload control, the method comprising:
    removing material during a plurality of work cycles with at least one loading machine;
    associating the at least one loading machine relative to at least one haulage machine;
    determining the relative locations of the at least one loading machine and the at least one haulage machine;
    during the plurality of work cycles, loading removed material into the at least one haulage machine with the at least one loading machine;
    determining payload and payload distribution within the at least one haulage machine at least before a last work cycle of the plurality of work cycles;
    determining, using at least one processing unit, an amount and position within the at least one haulage machine of additional payload desired in at least the last work cycle of the plurality of work cycles to obtain desired payload and payload distribution within the at least one haulage machine; and
    communicating the determined amount and position to the at least one loading machine via a machine-to-machine communication system.

2. The method of claim 1, including determining payload and payload distribution within the at least one haulage machine before each work cycle of the plurality of work cycles.

3. The method of claim 2, including displaying, on a display device associated with an operator station of the at least one loading machine, a visual representation of a receiving container of the at least one haulage machine.

4. The method of claim 3, including displaying a visual representation of the payload distribution within the receiving container of the at least one haulage machine on the display device.

5. The method of claim 1, including associating the at least one loading machine with a plurality of haulage machines, and determining the relative locations of each of the at least one loading machine and the plurality of haulage machines relative to one another.

6. The method of claim 1, including utilizing the machine-to-machine communication system to signal the at least one loading machine when the at least one haulage machine is properly positioned for loading, and to signal the at least one haulage machine when the last work cycle of the plurality of work cycles is completed.

7. The method of claim 1, including sending a signal from the at least one loading machine, via the machine-to-machine communication system, to the at least one haulage machine identifying at least one machine size parameter of the at least one loading machine;
    wherein at least one of the amount of additional payload desired and a total number of work cycles is determined based on the at least one machine size parameter.

8. The method of claim 1, including communicating to the at least one loading machine, via a machine-to-machine communication system, the amount and position within the at least one haulage machine of additional payload required after each work cycle of the plurality of work cycles to ensure proper payload and payload distribution within the at least one haulage machine.

9. The method of claim 8, including removing only sufficient material with the at least one loading machine, during the last work cycle of the plurality of work cycles, that will increase the payload of the at least one haulage machine to its proper payload.

10. The method of claim 9, including positioning the sufficient material on a bucket of the at least one loading machine during the last work cycle of the plurality of work cycles so as to ensure placement of the material within the at least one haulage machine at a location that will ensure proper payload distribution.

11. The method of claim 1, wherein the amount and the position of the additional payload desired are autonomously communicated to the at least one loading machine via the machine-to-machine communication system after determining the payload and payload distribution.

12. A system for enhancing payload of a haulage machine, the system comprising:
    a fleet of machines, including at least one haulage machine and at least one loading machine, the at least one loading machine configured to remove material and load the material into the at least one haulage machine during a plurality of work cycles;
    a machine-to-machine communication system configured to provide communication between the at least one haulage machine and the at least one loading machine;
    a controller associated with the at least one haulage machine and configured to determine the payload and payload distribution within the at least one haulage machine at least before a last work cycle of the plurality of work cycles; and
    a controller associated with the at least one loading machine and configured to receive, via the machine-to-machine communication system:
        a first signal from the at least one haulage machine indicating that the at least one haulage machine is positioned for loading, and a second signal from the at least one haulage machine indicating an amount and position within the at least one haulage machine of additional payload desired in a last work cycle of the plurality of work cycles to obtain desired payload and payload distribution within the at least one haulage machine, wherein the controller associated with the at least one haulage machine is configured to calculate the amount of additional payload desired.

13. The system of claim 12, wherein the controller associated with the at least one haulage machine is configured to determine the payload and payload distribution within the at least one haulage machine before each work cycle of the plurality of work cycles.

14. The system of claim 12, including a display device associated with an operator station of the at least one loading machine and configured to display a visual representation of a receiving container of the at least one haulage machine, the display device further configured to display a visual representation indicating the amount and location of material required to ensure proper payload and payload distribution with the at least one haulage machine.

15. The system of claim 12, wherein the at least one haulage machine includes a display device associated with an operator station of the at least one haulage machine and configured to display a visual representation of the location of the at least one loading machine.

16. The system of claim 12, including a plurality of haulage machines, and wherein the machine-to-machine communication system is configured to provide communication between each of the haulage machines and the at least one loading machine.

17. The system of claim 12, wherein the at least one loading machine is a wheel loader and the at least one haulage machine is an off-highway truck, and wherein the off-highway truck includes a receiving container including a visual indication on an exterior of the receiving container of the location of the center point for payload distribution within the receiving container, and positioned so as to permit an operator of the wheel loader to see the visual indication.

18. The system of claim 12, wherein the controller associated with the at least one haulage machine is further configured to receive, via the machine-to-machine communication system, a signal from the at least one loading machine indicating that the last work cycle is complete.

19. A loading machine, comprising:
a mobile unit including a bucket configured to remove material from a site and load the removed material into a receiving container of at least one haulage machine during a plurality of work cycles;
a machine-to-machine communication system associated with the loading machine and configured to enable communication between the loading machine and the at least one haulage machine;
a controller associated with the loading machine, the controller configured to receive data from the at least one haulage machine, via the machine-to-machine communication system, indicating an amount and distribution of payload required during at least the last work cycle of the plurality of work cycles to obtain desired payload and payload distribution within the at least one haulage machine; and
a display device associated with the loading machine and configured to display a visual representation of the receiving container of the at least one haulage machine, and configured to display a visual indication of the amount and distribution of payload desired during at least the last work cycle of the plurality of work cycles to obtain desired payload and payload distribution within the at least one haulage machine;
wherein the loading machine is configured to adjust an amount of a load carried by the bucket based on the amount of payload desired during at least the last work cycle so that the amount of the load is capable of being less than a full load of the bucket; and
wherein the loading machine is configured to indicate to an operator when the loading machine is properly located relative to the at least one haulage machine to allow the at least one loading machine to load the additional payload desired into the at least one haulage machine.

20. The loading machine of claim 19, wherein:
the controller associated with the at least one loading machine is further configured to receive, via the machine-to-machine communication system, a signal from the at least one haulage machine identifying at least one machine parameter of the at least one haulage machine; and
the loading machine is configured to indicate to the operator when the loading machine is properly located relative to the at least one hauling machine based on the at least one machine parameter of the at least one haulage machine.

21. The loading machine of claim 20, wherein the at least one machine parameter includes a size of the at least one haulage machine and a type of the at least one haulage machine.

22. The loading machine of claim 19, wherein the visual representation reflects a desired load split for the at least one haulage machine.

23. The loading machine of claim 22, wherein the desired load split indicates a difference in a desired load carried by a front axle and a rear axle of the at least one haulage machine.

* * * * *

UNITED STATES PATENT AND TRADEMARK OFFICE
CERTIFICATE OF CORRECTION

| | | |
|---|---|---|
| PATENT NO. | : 8,386,134 B2 | Page 1 of 1 |
| APPLICATION NO. | : 11/905334 | |
| DATED | : February 26, 2013 | |
| INVENTOR(S) | : Morey et al. | |

It is certified that error appears in the above-identified patent and that said Letters Patent is hereby corrected as shown below:

On the Title Page, Column 1, Item 54 (Title), line 1, and in the Specification, Column 1, line 1, delete "MACHINE TO-MACHINE" and insert -- MACHINE-TO-MACHINE --.

Signed and Sealed this
Eighteenth Day of August, 2015

Michelle K. Lee
*Director of the United States Patent and Trademark Office*